United States Patent
Maki et al.

(10) Patent No.: US 8,825,248 B2
(45) Date of Patent: Sep. 2, 2014

(54) INFORMATION TERMINAL AND CRUISE CONTROLLER FOR ELECTRIC-POWERED VEHICLE

(75) Inventors: Kentaro Maki, Ushiku (JP); Takashi Okada, Hitachinaka (JP); Masao Sakata, Warabi (JP)

(73) Assignee: Clarion Co., Ltd., Saitama-shi (JP)

( * ) Notice: Subject to any disclaimer, the term of this patent is extended or adjusted under 35 U.S.C. 154(b) by 118 days.

(21) Appl. No.: 13/540,699

(22) Filed: Jul. 3, 2012

(65) Prior Publication Data

US 2013/0013139 A1 Jan. 10, 2013

(30) Foreign Application Priority Data

Jul. 6, 2011 (JP) ................................. 2011-150192

(51) Int. Cl.
- *G01C 21/00* (2006.01)
- *G06F 7/00* (2006.01)
- *B60K 31/00* (2006.01)
- *G01C 21/34* (2006.01)
- *G01C 21/36* (2006.01)

(52) U.S. Cl.
CPC ........ *G01C 21/3469* (2013.01); *G01C 21/3697* (2013.01)
USPC ............................................ 701/22; 701/209

(58) Field of Classification Search
USPC .................................................. 701/22, 209
See application file for complete search history.

(56) References Cited

U.S. PATENT DOCUMENTS

| | | | |
|---|---|---|---|
| 5,790,976 A * | 8/1998 | Boll et al. ................... | 455/456.5 |
| 6,864,807 B2 * | 3/2005 | Todoriki et al. .............. | 340/988 |
| 7,369,938 B2 * | 5/2008 | Scholl .......................... | 701/428 |
| 7,586,290 B2 * | 9/2009 | Hirata et al. .................. | 320/132 |
| 8,290,701 B2 * | 10/2012 | Mason et al. ................ | 701/422 |
| 8,301,323 B2 | 10/2012 | Niwa | |
| 8,306,737 B2 * | 11/2012 | Nguyen ........................ | 701/410 |
| 8,532,904 B2 | 9/2013 | Takeuchi et al. | |
| 2009/0048746 A1 | 2/2009 | Kaigawa | |
| 2011/0071932 A1 | 3/2011 | Agassi et al. | |

FOREIGN PATENT DOCUMENTS

| | | |
|---|---|---|
| CN | 101238020 A | 8/2008 |
| CN | 101952137 A | 1/2011 |
| CN | 101952154 A | 1/2011 |
| CN | 101981412 A | 2/2011 |

(Continued)

OTHER PUBLICATIONS

Chinese Office Action dated Feb. 11, 2014 (4 pages).

*Primary Examiner* — Mary Cheung
*Assistant Examiner* — Michael Berns
(74) *Attorney, Agent, or Firm* — Crowell & Moring LLP

(57) ABSTRACT

Disclosed is an information terminal for electric-powered vehicles or a cruise controller therefor to provide a driver with a traveling method that can shorten a total required time to a destination including a charging time. An information terminal for electric-powered vehicle configured to calculate a required time for the vehicle to travel a route from a current position to a destination in accordance with map information, includes: route setting means that searches for a route to the destination; recharging place setting means that sets a charging place on a way of the route to the destination set by the route setting means; and charging facility information acquisition means that acquires information on the charging place set by the recharging place setting means. A recommended vehicle speed or a vehicle speed range including the recommended vehicle speed at a section to the charging place is calculated.

6 Claims, 13 Drawing Sheets

(56) References Cited

FOREIGN PATENT DOCUMENTS

| | | | |
|---|---|---|---|
| JP | 9-119839 A | 5/1997 |
| JP | 2006-112932 A | 4/2006 |
| JP | 2010-32459 A | 2/2010 |
| JP | 2010-210271 A | 9/2010 |
| JP | 2011-102739 A | 5/2011 |

\* cited by examiner

| Vehicle speed | Arrival at destination | Charging time included |
|---|---|---|
| 80 km/h | 12:56 | 25 min. |
| 90 km/h | 13:00 | 35 min. |
| 100 km/h | 13:06 | 45 min. |

Calculation conditions
• Electric-powered vehicle of light vehicle class
• Distance to charging place: 100km
• Charger capacity: 10kW

INFORMATION TERMINAL AND CRUISE CONTROLLER FOR ELECTRIC-POWERED VEHICLE

BACKGROUND OF THE INVENTION

1. Field of the Invention

The present invention relates to a vehicle-mounted information terminal used for electric-powered vehicles and a vehicle system using the same.

2. Background Art

Since it takes a several tens of minutes to a few hours to charge a vehicle-mounted battery of electric-powered vehicles, additional charging on the way to a destination, if needed, means a too long charging time to be ignored in the total required time. This impairs the convenience of electric-powered vehicles, and becomes one of factors inhibiting the penetration of electric-powered vehicles.

Patent Document 1 (JP Patent Application Publication No. 2006-112932 A) shows background art of the present invention. This Patent Document 1 relates to a navigation system of electric-powered vehicles, and discloses a navigation system configured to display a total required time to a destination including a charging time while providing information on the vicinity of a charging facility, such as places to eat, sightseeing spots and leisure facilities. This system allows a user to understand the total required time to a destination including a charging time and to effectively use a waiting time during charging for eating, sightseeing and the like.

SUMMARY OF THE INVENTION

Conventionally it is possible for a driver to understand the total required time including a charging time. There is, however, a further demand to provide a driver with a driving method that can shorten such a total required time. It is an object of the present invention to respond to such a demand.

In order to fulfill the aforementioned object, an information terminal for electric-powered vehicle of the present invention is configured to calculate a required time for the vehicle to travel a route from a current position to a destination in accordance with map information. The information terminal for electric-powered vehicle includes: route setting means that searches for a route to the destination for setting; recharging place setting means that sets a charging place on a way of the route to the destination set by the route setting means; and charging facility information acquisition means that acquires information on the charging place set by the recharging place setting means. A recommended vehicle speed or a vehicle speed range including the recommended vehicle speed at a section to the charging place is calculated.

The information terminal for electric-powered vehicle of the present invention further may include remaining battery amount acquisition means that acquires remaining capacity of a vehicle-mounted battery. A charging time at the charging place and a total required time to the destination including the charging time may be further calculated.

The information terminal for electric-powered vehicle of the present invention further may include accessories usage detection means that detects a usage condition of vehicle-mounted accessories. When the accessories usage detection means confirms an increase of electric power used by the accessories, the recommended vehicle speed or the vehicle speed range including the recommended vehicle speed may be changed to a high vehicle-speed side as compared with prior to the confirmation of the increase of electric power used by the accessories.

A cruise controller for electric-powered vehicle of the present invention includes the aforementioned information terminal, and further includes vehicle-speed setting means that sets the recommended vehicle speed as a standard vehicle speed. A vehicle speed of the electric-powered vehicle automatically follows the standard vehicle speed.

Effects of the Invention

If a vehicle-mounted battery of an electric-powered vehicle traveling from the current position to a destination needs additional charging on the way, a traveling method according to the present invention can shorten a total required time including a charging time. Thereby the convenience of electric-powered vehicles is improved, labor by the driver or a fellow passenger to investigate a driving method can be reduced, and time can be effectively used.

DESCRIPTION OF A PREFERRED EMBODIMENT OF THE INVENTION

In the following, embodiments of the invention are described with reference to the drawings.

Embodiment 1

Embodiment 1 shows an exemplary vehicle-mounted information terminal to give guidance on a vehicle-speed, which can shorten a total required time including a charging time.

Figure 12:
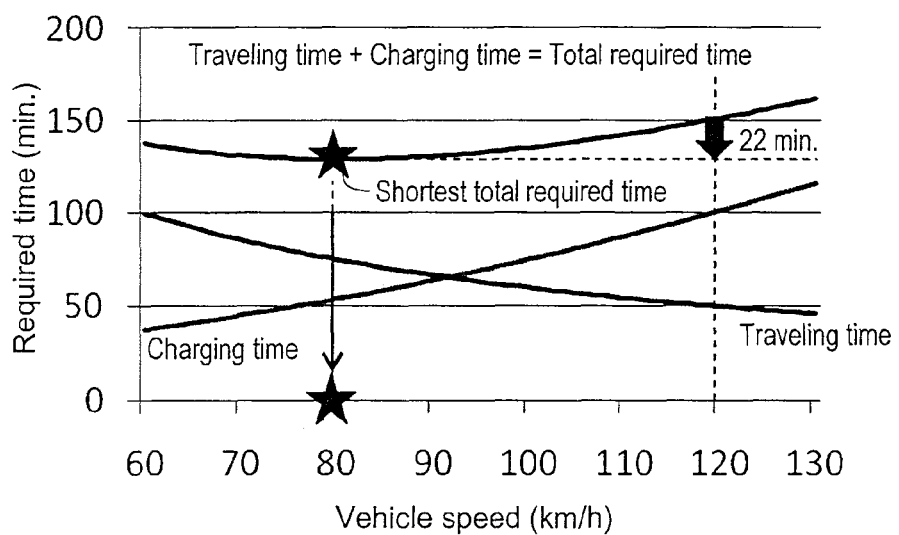
FIG. 12 shows the existence of a vehicle speed giving the shortest total required time by a tradeoff between traveling time and charging time.

To begin with, a relationship between a vehicle speed and a total required time including a charging time is described. FIG. 12 shows the traveling time, the charging time and the total required time of the sum of them in the case where, following traveling of 100 km by an electric-powered vehicle on a flat road at a predetermined vehicle speed, energy consumed by the traveling is charged. The electric-powered vehicle is ranked as a light vehicle class, and the output from the charging facility is 10 kW. Energy consumed by the usage of accessories during traveling is not included in the calculation.

As a vehicle speed becomes higher, a traveling time required to finish the traveling of 100 km becomes shorter. On the other hand, the charging time after 100-km traveling becomes longer as the vehicle speed becomes higher. This is because a higher vehicle speed means larger air resistance. Air resistance is known to be proportional to the square of the vehicle speed. This means that traveling at a higher vehicle speed consumes more energy even for the same traveling distance, and more energy has to be supplied by charging.

In the graphs showing the relationship of the required time versus vehicle speeds as in FIG. 12, each of the curves representing changes of the traveling time and the charging time is a convex downward, and therefore the curve of the total required time as the sum of them also becomes a convex downward and gives the shortest total required time at a certain vehicle speed. In the example shown in FIG. 12, the traveling at the vehicle speed of 80 km gives the shortest total required time, which shortens the total required time by 20 minutes or more than the traveling of the same distance at the 120 km per hour.

Figure 13:
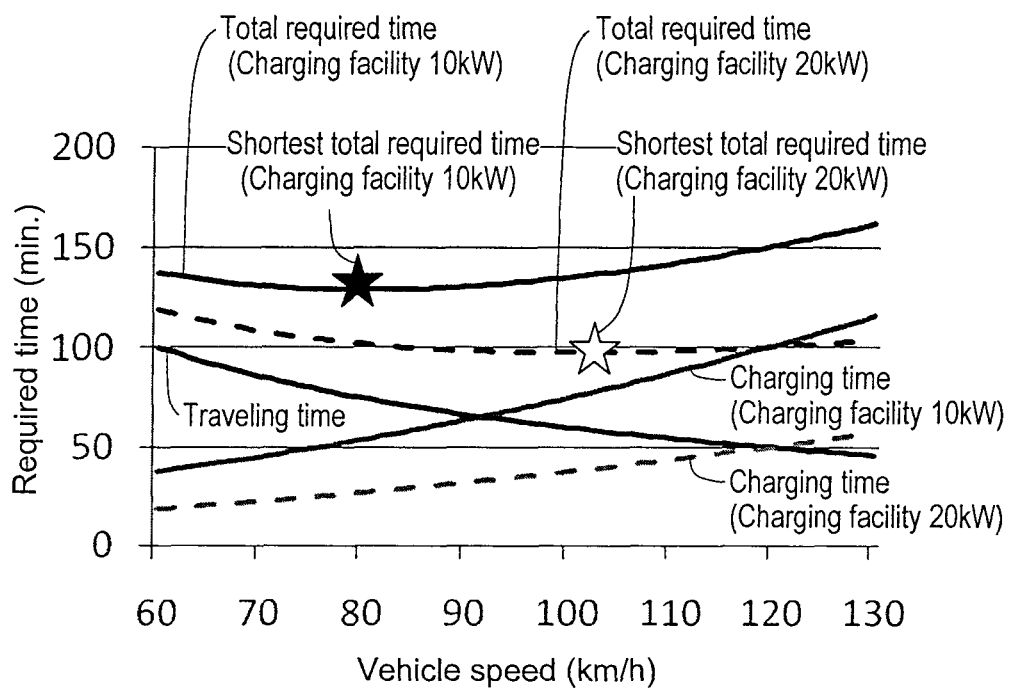
FIG. 13 shows that a vehicle speed for the shortest total required time changes with the output of the charging facility used.

The vehicle speed for the shortest total required time changes with the output from the charging facility. FIG. 13 shows such a change. As mentioned above, the charging time is proportional to the square of the vehicle speed. The proportionality coefficient thereof, however, is inversely proportional to the output from the charging facility, and accordingly a larger output from the charging facility means a smaller gradient of the curve representing a change of the charging time. As a result, as the output from the charging facility becomes larger, the vehicle speed for the shortest total required time shifts toward a high-vehicle speed side. Conversely as the output from the charging facility becomes smaller, the vehicle speed for the shortest total required time shifts toward a low-vehicle speed side.

Figure 14:
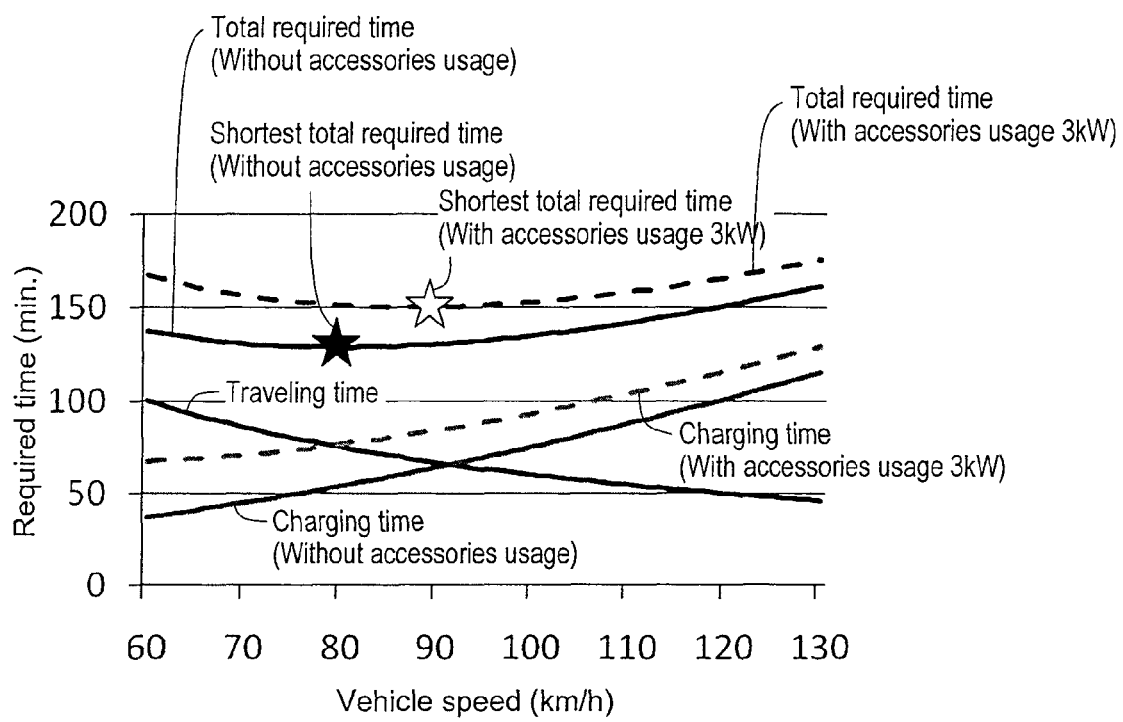
FIG. 14 shows that a vehicle speed for the shortest total required time changes with the presence or not accessories used.

The vehicle speed for the shortest total required time changes also with a usage condition during traveling of accessories such as an air-conditioner that are electric/electronic devices connected to a battery for traveling. FIG. 14 shows such a change. In the case of accessories consuming electric power a lot, than the case where it doesn't, the energy consumption resulting from the accessories can be reduced more by high-speed traveling to shorten the traveling time, and so the charging time can be shortened. Accordingly, as accessories consumes electric power more during traveling, the vehicle speed for the shortest total required time shifts toward a high-vehicle speed side.

The vehicle speed for the shortest total required time changes also with an outside temperature in the vicinity of the charging facility. In a situation where the battery temperature tends to be high, in order to prevent overheating of the battery during charging, the battery is cooled during charging with air conditioning using a battery power. Since the battery discharges while being charged, the battery will influence similarly to the case of a charging facility of a smaller output. As a result, the vehicle speed for the shortest total required time shifts to a low-vehicle speed side. In the case of an extremely low outside temperature as well, heating is used to keep the battery temperature during charging, and therefore the vehicle speed for the shortest total required time shifts to a low-vehicle speed side.

As stated above, when there is a chance for charging on the way, there is a vehicle speed giving the shortest total required time. A value of such a vehicle speed changes with at least the output from a charging facility used, the usage of accessories during traveling and an outside temperature in the vicinity of the charging facility. In Embodiment 1, considering these factors, an exemplary vehicle-mounted information terminal to give guidance on a vehicle speed for a shortened total required time including a charging time is described.

Figure 1:
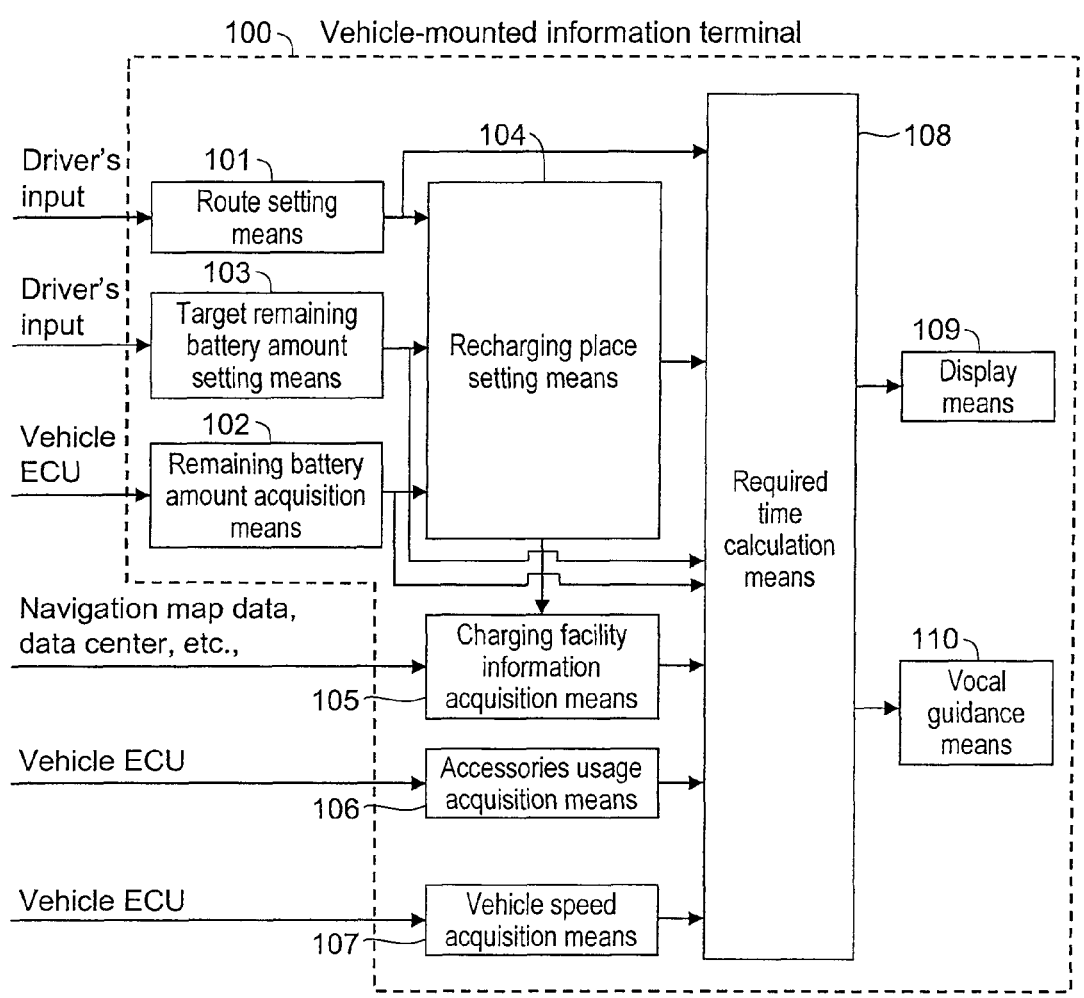
FIG. 1 shows an exemplary system configuration of a vehicle-mounted information terminal that is Embodiment 1 of the present invention.

Referring to FIG. 1, an exemplary system configuration of a vehicle-mounted information terminal of Embodiment 1 is briefly described. A vehicle-mounted information terminal 100 of Embodiment 1 includes means of blocks 101 to 110 described below.

Route setting means 101 searches for a route to a destination designated by a driver or a fellow passenger (a driver and the like) for setting. Remaining battery amount acquisition means 102 acquires a remaining amount of electric power left in a vehicle-mounted battery from a vehicle ECU. Target remaining battery amount setting means 103 sets, based on an input by the driver and the like or automatically, a target of the remaining battery amount at the designated destination.

Recharging place setting means 104 determines whether additional charging (hereinafter called recharging) is necessary or not on the way to the destination on the basis of the route set by the route setting means 101, the remaining battery amount acquired by the remaining battery amount acquisition means 102 and the target remaining battery amount set by the target remaining battery amount setting means 103. When the recharging is necessary, the recharging place setting means 104 sets a recharging place to be used as a stopping position.

Charging facility information acquisition means 105 acquires, from navigation map data or a data center, a nominal charging output of the charging facility and desirably an expected temperature in the vicinity of the charging facility and an expected waiting time to use the charging facility for the charging facility installed at the recharging place set by the recharging place setting means 104.

Accessories condition acquisition means 106 acquires a latest usage condition of accessories from the vehicle ECU and desirably calculates electric power used by the accessories. Vehicle speed acquisition means 107 acquires a latest vehicle speed from the vehicle ECU. Required time calculation means 108 assumes vehicle speeds in several patterns for a section to the recharging place, and calculates total required times as the sum of a traveling time and a charging time for the traveling at the vehicle speeds in several patterns on the basis of information from means of block 101 to block 107. Display means 109 displays a vehicle speed that can shorten the total required time on the basis of the calculation result of the total required time.

Figure 5:
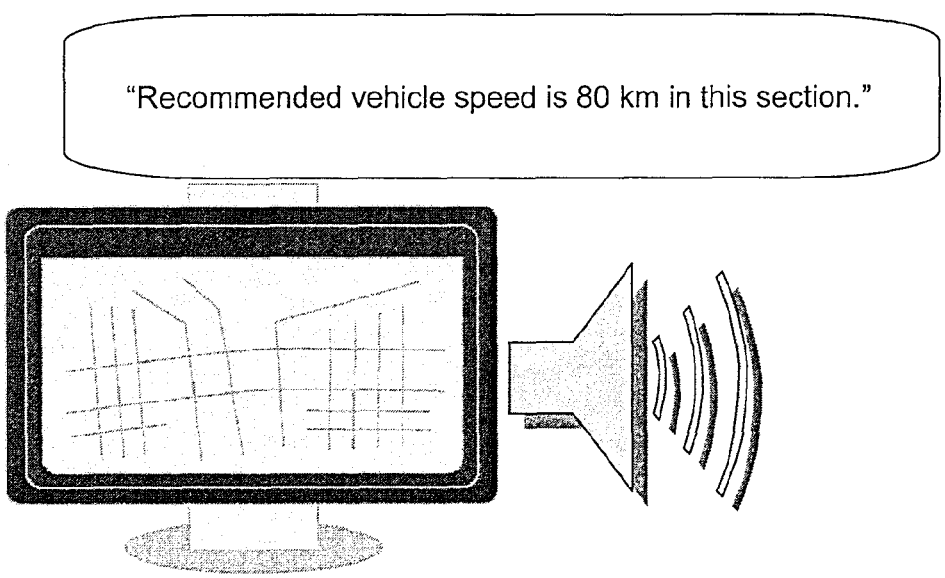
FIG. 5 shows exemplary guidance announced by vocal guidance means of Embodiment 1.
Figure 6:
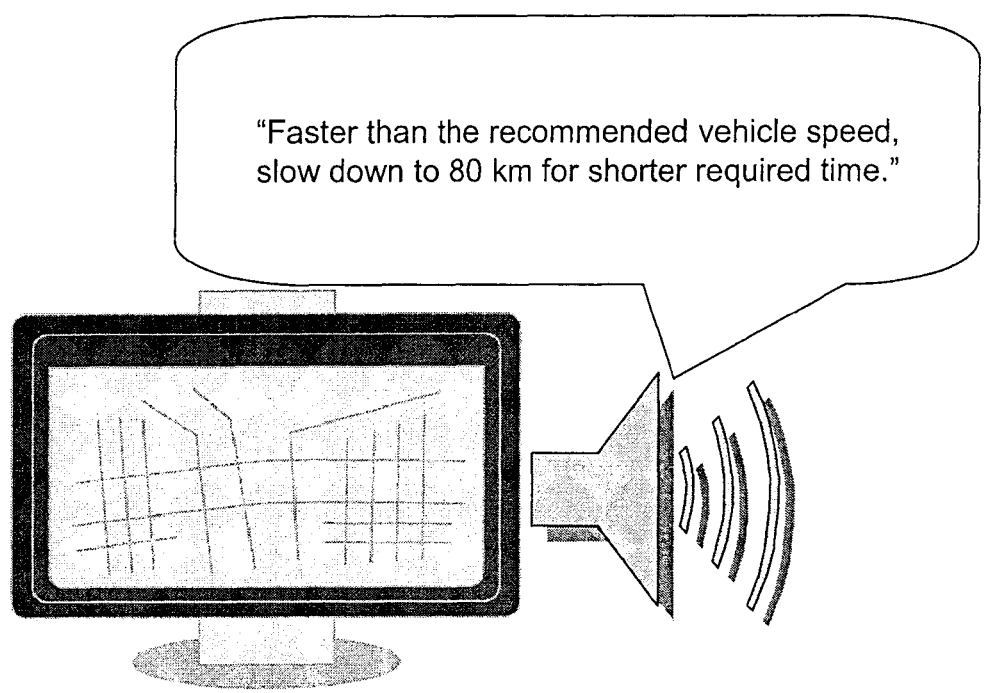
FIG. 6 shows another exemplary guidance announced by vocal guidance means of Embodiment 1.

The system configuration of Embodiment 1 desirably includes a vocal guidance means 110. The vocal guidance means 110 refers to the total required times for different vehicle speeds calculated by the required time calculation means 108, and as shown in FIG. 5 the vocal guidance means 110 announces by voice a vehicle speed for the shortest total required time as a recommended vehicle speed. As another example of the announcement by the vocal guidance means 110, when the current speed exceeds the recommended vehicle speed, an announcement may be made to urge a decrease in speed as shown in FIG. 6.

Referring next to a flowchart of FIG. 7, the overall processing by the vehicle-mounted information terminal according to Embodiment 1 is described below. At Step S701, a traveling route for a vehicle and a recharging place as needed are set using the route setting means 101 and the recharging place setting means 104. The details of the route and the recharging place setting processing at Step S701 are described later.

At Step S702, information on a charging facility installed at the recharging place is acquired using the charging facility information acquisition means 105. Herein a nominal charging output of the charging facility and desirably an expected temperature in the vicinity of the charging facility and an expected waiting time to use the charging facility are acquired. The nominal charging output is a value specific to the charging facility, but may change with the congestion degree of the recharging place, a time zone and the like. That is, when a plurality of charging facilities are prepared at the recharging place and the recharging place is congested, a nominal output of each charging facility is narrowed small. Further considering different electric-power rates for time zones, a nominal output from each charging facility may be narrowed small in a time zone for a high electric-power rate time zone. The acquisition of the expected temperature enables expectation of consumed energy by air-conditioning used for battery cooling or heating during recharging, and the output during charging may be corrected downward. The acquisition of the expected waiting time enables expectation of an energy consumed amount by accessories during a waiting time to use the charging facility, whereby the energy amount to be recharged can be estimated precisely.

At Step S703, route guidance is started on the basis of the result of the route/recharging place setting at Step S701.

At Step S704, the usage condition of accessories such as an air-conditioning device that is an electric/electronic device connected to a battery for travelling is acquired using the accessories condition acquisition means 106 to acquire electric power used by the accessories.

At Step S705, the latest vehicle-speed history is acquired using the vehicle speed acquisition means 107 to calculate the current vehicle speed. For instance, the average vehicle speed for the immediately preceding 1 minute may be used as the current vehicle speed.

At Step S706, the current remaining battery amount is acquired using the remaining battery amount acquisition means 102.

At Step S707, a plurality of vehicle-speed candidates are set within the range of a legal speed or lower for the traveling road. For instance, when the vehicle travels on a freeway with the legal upper limit vehicle-speed of 100 km/hour, the vehicle-speed candidates set may include 80 km/hour, 90 km/hour and 100 km/hour. The minimum value of the vehicle-speed candidates is set small so as not to disturb the traffic flow on the road.

At Step S708, based on the current vehicle-speed calculated at Step S705, the vehicle-speed candidates set at Step S707 and other information, a total required time as the sum of the traveling time and the charging time is calculated, and the resultant of the calculation is stored as an array. Herein, in order to avoid inappropriate derivation of the required time, when it is determined based on the current vehicle speed that the vehicle is in an obvious low-speed traveling state (20 km/hour or lower, for example), the calculation for the current vehicle speed is not performed. The detailed calculation of required times for different vehicle speeds at Step S708 is described later.

At Step S709, on the basis of data on the required times for different vehicle-speeds stored as an array at Step S708, guidance on a vehicle-speed enabling shortening of a total required time is given. Herein, when an obviously difficult situation is found for travelling at a recommended vehicle speed as in the case of traffic congestion, guidance is not given so as to avoid the driver and the like from having a sense of bothering.

Figures 2, 3:
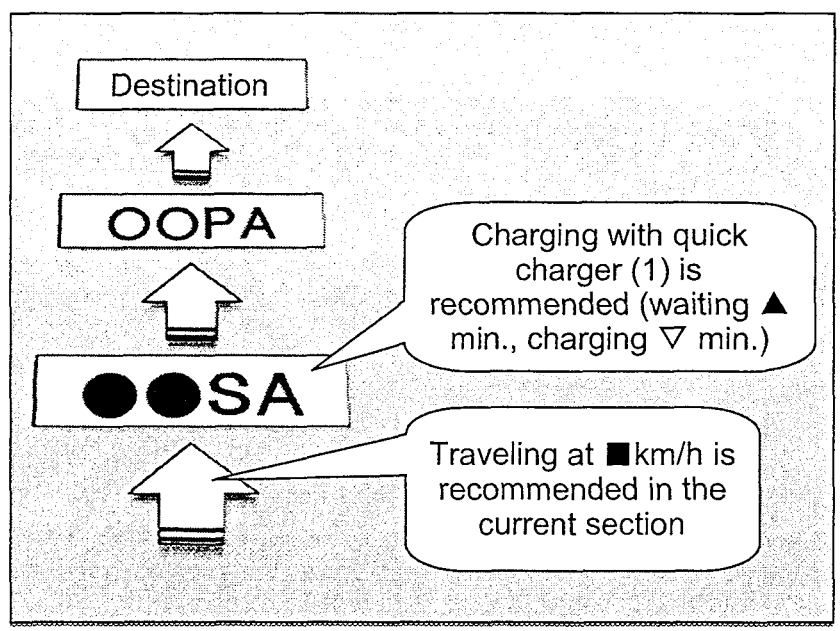
FIG. 2 shows exemplary guidance displayed on display means of Embodiment 1.
FIG. 3 shows another exemplary guidance displayed on display means of Embodiment 1.

Various patterns can be considered for the method of giving guidance on a recommended vehicle speed. FIG. 2 shows an example thereof, illustrating an expected arrival time to the destination (required time) and an expected charging time for each of the vehicle-speed candidates. In this way, data is shown for each of the plurality of vehicle speeds, whereby the driver and the like can clearly tell the effect of changing the vehicle speed. The display of FIG. 2 may additionally include an expected arrival time to the destination when traveling is continued at the current vehicle speed and a charging time included therein, whereby a comparison between the recommended state and the current state can be made easily. Further the displayed charging time may be checked against a time required by the driver and the like to rest, whereby a vehicle speed without wasting time can be selected.

FIG. 3 shows another exemplary display for guidance at Step S709. In this example, a recommended vehicle speed at a section to the recharging place as well as information on the charging time at the recharging place are displayed. Although the information amount is less than that of FIG. 2, the display is easy to understand visually.

Figure 4:
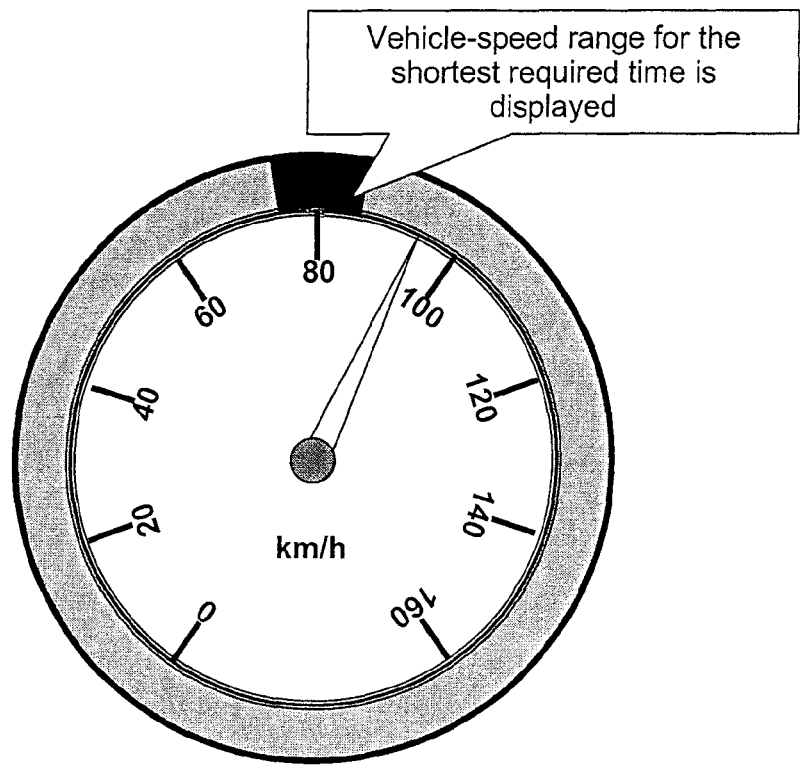
FIG. 4 shows still another exemplary guidance displayed on display means of Embodiment 1.

FIG. 4 shows still another exemplary display for guidance at Step S709. In this example, a recommended vehicle speed is overlapped on a speed meter for display. In this case, a predetermined range of vehicle speeds around the recommended vehicle speed (e.g., ±5 km/hour) is additionally displayed, whereby viewability can be improved. Cruising by the driver so that a needle of the speed meter is within the range, whereby driving can be performed so as to shorten the total required time. As the guidance at Step S709, guidance by voice may be used together or may be used alone.

FIG. 5 shows an exemplary scene of announcing a recommended vehicle speed at the section of the current traveling, and FIG. 6 shows an exemplary scene of announcing to urge a decrease in speed when the current vehicle speed exceeds a recommended vehicle speed. A method of the guidance at Step S709 is not limited to the examples of FIG. 2 to FIG. 6, and may be in any form as long as guidance is given on a speed or a speed range enabling shortening of the total required time.

At Step S710, three types of recalculation patterns (a), (b) and (c) are prepared for recalculation of required times for different vehicle speeds, and determination is made which pattern of the recalculation is to be performed. In the classification pattern (a), resetting has to be performed from the route/recharging place setting. Cancellation of a guided route, deviation from the route and recharging performed at an unexpected place apply to this case. In the classification pattern (b), charging facility information has to be acquired again. Manual change of the recharging place and a considerable updating of information on the charging facility supposed to be used (breakdown of the charging facility and extension of a waiting time) apply to this case. The pattern (c) is the most frequently performed recalculation (updating), and the elapse of a predetermined time (e.g., 1 minute) and a large change in the accessories usage state such as of an air-conditioning device apply to this case.

At Step S711, on the basis of these three patterns (a), (b) and (c) at Step S710, the procedure returns to the steps corresponding thereto. In the pattern (a), the procedure returns to Step S701. In the pattern (b), the procedure returns to Step S702. In the pattern (c), the procedure returns to Step S704. At Step S710, when the status does not correspond to any one of the patterns of (a), (b) and (c), then it is determined at Step S711 that recalculation is not necessary, and the procedure proceeds to Step S712.

At Step S712, determination is made for a condition on the guidance completion. A condition on the guidance completion includes the case where the vehicle arrives at the recharging place and the case where the vehicle is confirmed to stop for predetermined time duration (e.g., 5 minutes) or longer.

At Step S713, when the determination result at Step S712 meets the guidance completion condition, the procedure proceeds to Step S714 to complete the guidance. When the determination result does not meet the guidance completion condition, the procedure returns to Step S709 to continue the guidance.

That is the description on the overall processing by the vehicle-mounted information terminal of Embodiment 1. Referring next to FIG. 8, the processing of the route/recharging place setting at Step S701 in the flowchart of FIG. 7 is described below.

At Step S801, when a navigation function is activated, the procedure proceeds to Step S802. At Step S802, when a destination is set, the procedure proceeds to Step S803.

At Step S803, a remaining battery amount is acquired using the remaining battery amount acquisition means 102. At the next Step S804, the target of the remaining battery amount set by the target remaining battery amount setting means 103 is acquired. The target remaining battery amount may be manually set by the driver or may be set automatically. When it is automatically set, the presence or not of a charging facility at the destination is acquired. When there is no charging facility available at the destination, setting is desirably made so that at least the electricity amount enabling travelling to a charging facility closest to the destination can be left.

At Step S805, a traveling route to the destination is set. The details of the traveling route setting are described later.

At Step S806, determination is made as to whether recharging is necessary or not on the way of the route set at Step S805. This determination on the necessity of recharging at Step S806 is made based on the remaining battery amount acquired at Step S803, the target of the remaining battery amount set at Step S804, the length of the route set at Step S805 and desirably a legal vehicle speed and a road shape of the route set at Step S805.

At Step S807, when recharging is necessary on the basis of the determination result on the necessity of recharging at Step S806, the procedure proceeds to Step S808, where a recharging place is set. The setting of the recharging place at Step S808 is described later.

Figure 7:
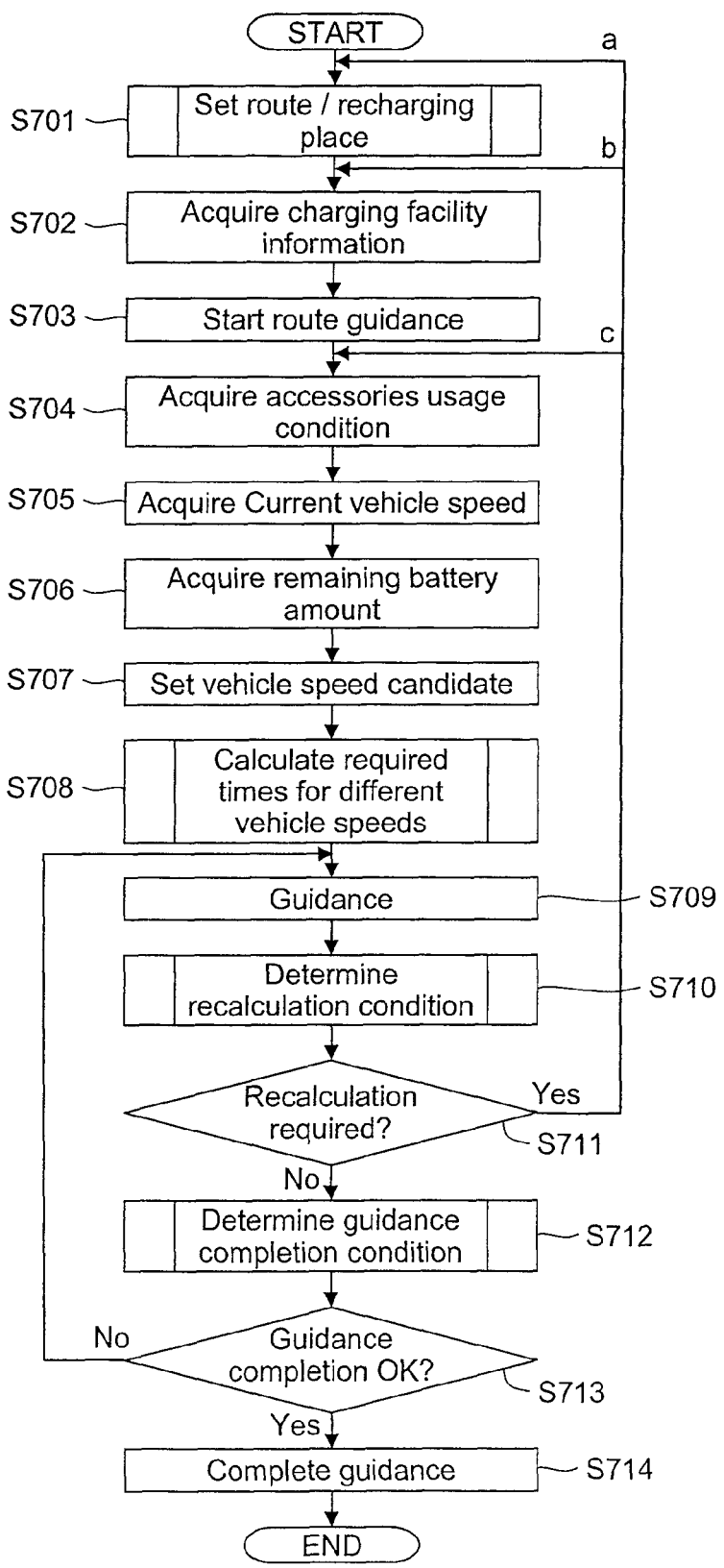
FIG. 7 is an exemplary flowchart showing the overall processing by the vehicle-mounted terminal of Embodiment 1.
Figure 8:
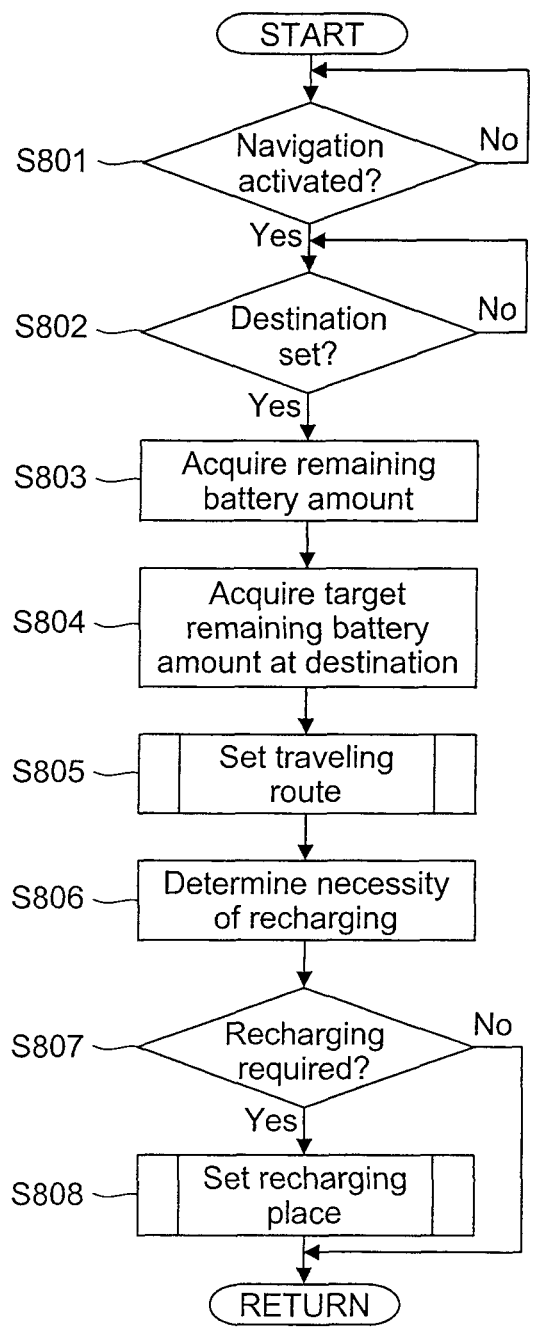
FIG. 8 is an exemplary flowchart showing the processing of route/recharging place setting of Embodiment 1.

At Step S807, where recharging is not necessary, the route/recharging setting processing ends, and the procedure returns to the flow of FIG. 7 and proceeds to Step S702.

Figure 9:
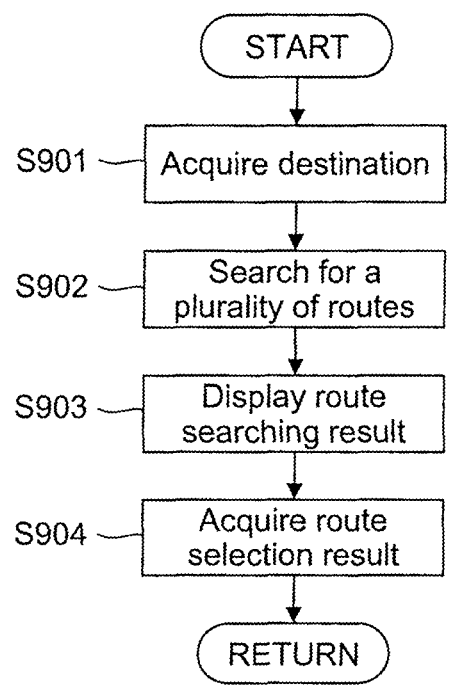
FIG. 9 is an exemplary flowchart showing the processing of traveling route setting of Embodiment 1.

Referring next to FIG. 9, the processing of the traveling route setting at Step S805 (FIG. 8) is described below.

At Step S901, the set destination is acquired. At Step S902, searching for a plurality of routes to the destination is performed. Possible examples of the plurality of routes include a distance-first route (having a short route length), a time-first route (having a short traveling time), a toll road-first route (when a toll road is available, the toll road is preferentially used), an ordinary road-first route (not using a toll road) and a no-recharging-first route (route enabling to reach the destination without recharging). Herein, determination may be made as to whether the destination is reachable or not via a no-recharging-first route by a calculation assuming the traveling on the route at a standard vehicle speed calculated based on the legal speed.

At Step S903, the plurality of routes searched at Step S902 are displayed to the driver and the like. At Step S904, a result of selection for the display at Step S903 by the driver and the like is acquired, a route is decided and the procedure returns to the flow of FIG. 8.

Figure 10:
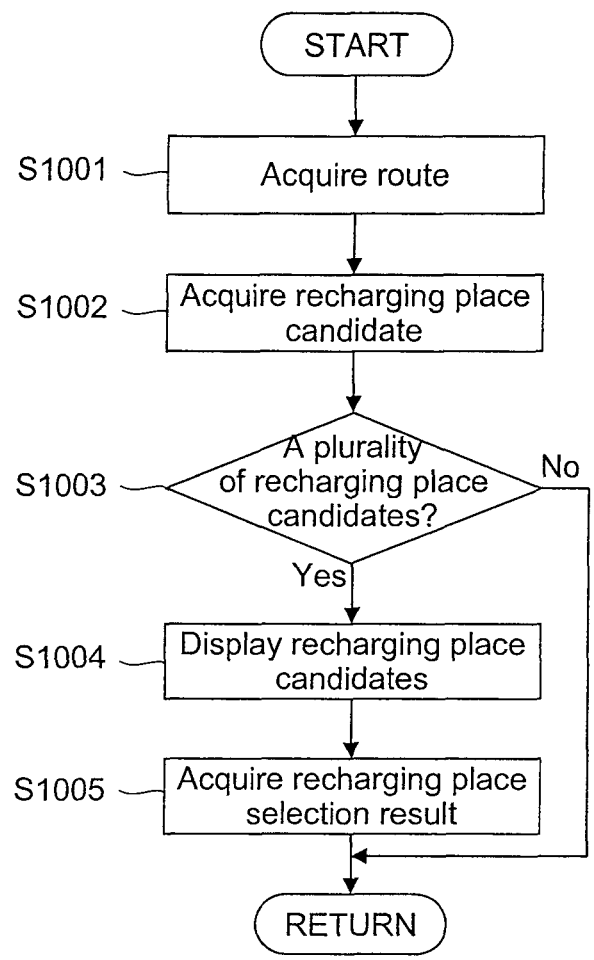
FIG. 10 is an exemplary flowchart showing the processing of recharging place setting of Embodiment 1.

Referring next to FIG. 10, the processing of the recharging place setting at Step S808 of FIG. 8 is described below. At Step S1001, the traveling route set at Step S805 is acquired.

At Step S1002, a candidate for recharging place on the traveling route or in the vicinity thereof is acquired. The candidate for recharging place is preferably acquired from map data of car navigation or a data center wirelessly communicating with the vehicle. When there are a plurality of candidates for recharging place acquired at Step S1002, the procedure proceeds from Step S1003 to Step S1004, where the plurality of candidates for recharging place are displayed to wait for selection by the driver and the like. At Step S1005, a selected recharging place is acquired, which is set as a recharging place to be used. Then, the procedure returns to the flow of FIG. 8 and further returns to the flow of FIG. 7, and then proceeds to Step S702. Herein, Step S1004 and Step S1005 may be automatically processed without waiting for the selection by the driver and the like.

On the other hand, when there is a single candidate for recharging place at Step S1003, the single candidate is set as a recharging place to be used. Then, the procedure returns to the flow of FIG. 8 and further returns to the flow of FIG. 7, and then proceeds to Step S702.

That is the description on the processing of the "route/recharging place setting" at Step S701 of FIG. 7. Next, the calculation method of the "required times for different vehicle speeds" at Step S708 is described by way of Expressions (1) to (8).

Figure 11:
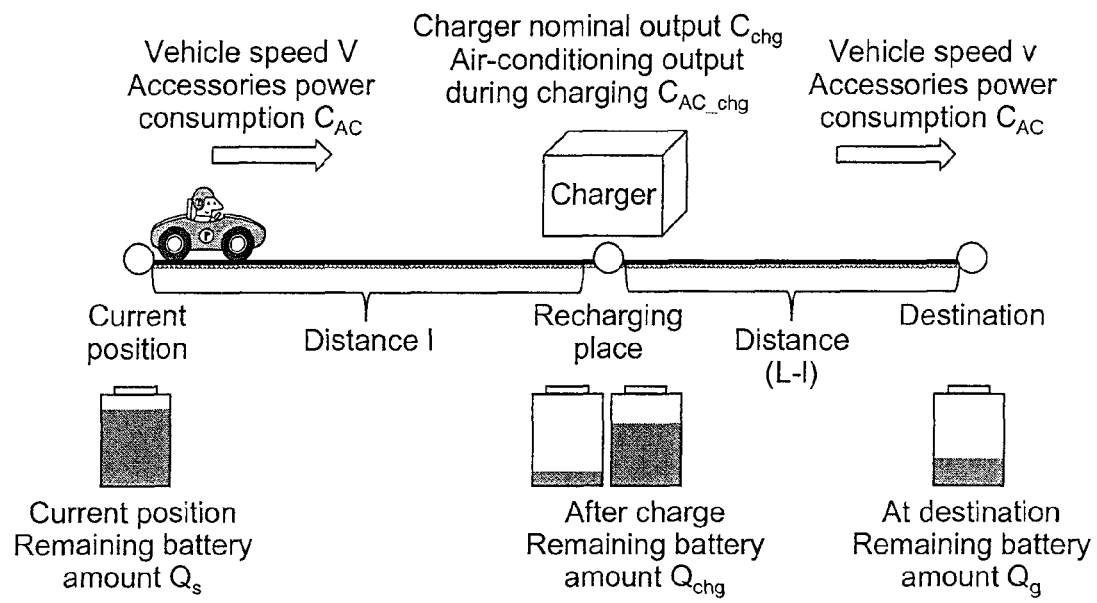
FIG. 11 is a conceptual diagram to explain a part of parameters used for total required time calculation of Embodiment 1.

FIG. 11 schematically illustrates a part of parameters used in the calculation. The following describes an example where the recharging chance is once.

A total required time $T_{sum}$ can be expressed as the sum of a traveling time $T_{drv}$, a charging time $T_{chg}$ and a waiting time at charging facility $T_{wait}$ by the following Expression (1):

$$T_{sum} = T_{drv} + T_{wait} + T_{chg} \quad (1)$$

The traveling time $T_{drv}$ and the charging time $T_{chg}$ can be expressed by the Expressions (2) and (3), respectively:

$$T_{drv} = \frac{l}{V} + \frac{L-l}{v} \quad (2)$$

$$T_{chg} = \frac{Q_{chg} - \left[Q_s - \left\{\int_0^l R_{sum} \cdot dx / \eta_{BtoT} + C_{AC} \cdot \left(\frac{l}{V} + T_{wait}\right) / \eta_{BtoAC}\right\}\right]}{C_{chg} \cdot \eta_{CtoB} - C_{AC\_chg} / (\eta_{CtoB} \cdot \eta_{BtoAC})} \quad (3)$$

As the waiting time $T_{wait}$, the value acquired at Step S702 (FIG. 7) is used.

The denominator on the right side of Expression (3) giving the charging time $T_{chg}$ is obtained by subtracting power consumption of the air-conditioning during charging from an output of the charging facility to be used, which can be said an effective charging output during charging. The air-conditioning during charging is means to hold the battery at a temperature in a predetermined range, and the output of the air-conditioning is predicted based on the ambient temperature of the charging facility acquired at Step S702.

The first term $Q_{chg}$ of the numerator on the right side of Expression (3) is a target battery capacity after recharging, and a minimum value of $Q_{chg}$ is calculated by Expression (4) using the target remaining battery amount $Q_{rest}$ at the destination and the energy consumption amount from the recharging place to the destination. For the actual recharging, the target remaining battery capacity after recharging may be selected from several stages by the charging facility, and guidance for automatic setting or for manual setting will be given so that charging is performed up to the value of $Q_{chg}$ or more derived by Expression (4):

$$Q_{chg} \geq Q_{rest} + \int_{l}^{L} R_{sum} \cdot dx / \eta_{BtoT} + C_{AC} \cdot \left(\frac{L-l}{v}\right) / \eta_{BtoAC} \quad (4)$$

Traveling resistance $R_{sum}$ used in Expression (3) and Expression (4) includes air resistance $R_a$, rolling resistance $R_r$ and gradient resistance $R_g$, which can be expressed by Expression (5) to Expression (8). Herein, the road gradient θ is available when map data of the car navigation system includes height data or gradient data, and the usage of the gradient θ can improve the expectation accuracy of the energy consumption amount:

$$R_{sum} = R_a(u) + R_r(\theta) + R_g(\theta) \quad (5)$$

$$R_a(u) = \frac{1}{2} \cdot \rho_{air} \cdot C_d \cdot A \cdot u^2 \quad (6)$$

$$R_r(\theta) = \mu_r \cdot M_v \cdot g \cdot \cos\theta \quad (7)$$

$$R_g(\theta) = M_v \cdot g \cdot \sin\theta \quad (8)$$

The signs in Expression (1) to Expression (8) are as follows:

$T_{sum}$: total required time [sec]
$T_{drv}$: traveling time [sec]
$T_{wait}$: charging facility waiting time [sec]
$T_{chg}$: charging time [sec]
l: distance from current place to recharging place [m]
L: distance from recharging place to destination [m]
V: vehicle speed from current place to recharging place [m/s]
v: vehicle speed from recharging place to destination [m/s]
$Q_{chg}$: target remaining battery amount after recharging at recharging place [Ws]
$Q_s$: remaining battery amount at current place [Ws]
$Q_g$: target remaining battery amount at destination [Ws]
$C_{AC}$: accessories power consumption during traveling [W]
$C_{chg}$: nominal output of charging facility at recharging place [W]
$C_{AC\_chg}$: air-conditioning output to hold battery temperature during charging [W]
$\eta_{BtoT}$: average energy efficiency from battery electric power to driving force
$\eta_{BtoAC}$: average energy efficiency from battery electric power to accessories output
$\eta_{CtoB}$: average energy efficiency from charger output to battery electric power $R_{sum}$: total traveling resistance [N]
$R_a$: air resistance [N]
$R_r$: rolling resistance [N]
$R_g$: gradient resistance [N]
u: vehicle speed [m/s]
$\rho_{air}$: air density [kg/m3]
$C_d$: air resistance coefficient [–]
A: vehicle front face projected area [m2]
θ: road gradient [rad]
$\mu_r$: rolling resistance coefficient [–]
$M_v$: vehicle weight [kg]
g: vehicle acceleration [m/s2]

Substituting the vehicle speed of each vehicle-speed candidate set at Step S707 (FIG. 7) in V (vehicle speed from current place to recharging place) of Expression (2) and (3), a total required time of each vehicle-speed candidate is calculated. As the vehicle speed v from the recharging place to the destination, a standard vehicle speed calculated based on the legal vehicle speed is used. Although the above description assumes the case of the recharging chance as once, even in the case of a plurality of recharging chances available, a relationship between the vehicle speed for a section to each recharging place and the total required time can be derived using a similar calculation method. That is the calculation method of the required times for different vehicle speeds at Step S708.

In this Embodiment 1, the information terminal including blocks 101 to 110 configured integrally is described as the vehicle-mounted information terminal 100. The present invention, however, is not limited to this vehicle-mounted information terminal, and a part of the functions thereof may be configured separately. More specifically, for instance, a part of the functions of blocks 101 to 110 may be divided using the ECU mounted on the vehicle, a mobile terminal of the driver and wireless communicable ground equipment, and the aforementioned operations may be implemented by the combination thereof. In that case, the "information terminal" of the present invention includes all of the terminals including the part of the functions of blocks 101 to 110.

Embodiment 2

Embodiment 2 relates to a cruise controller configured to set a target vehicle speed for vehicle-speed following so as to shorten a total required time.

Figure 15:
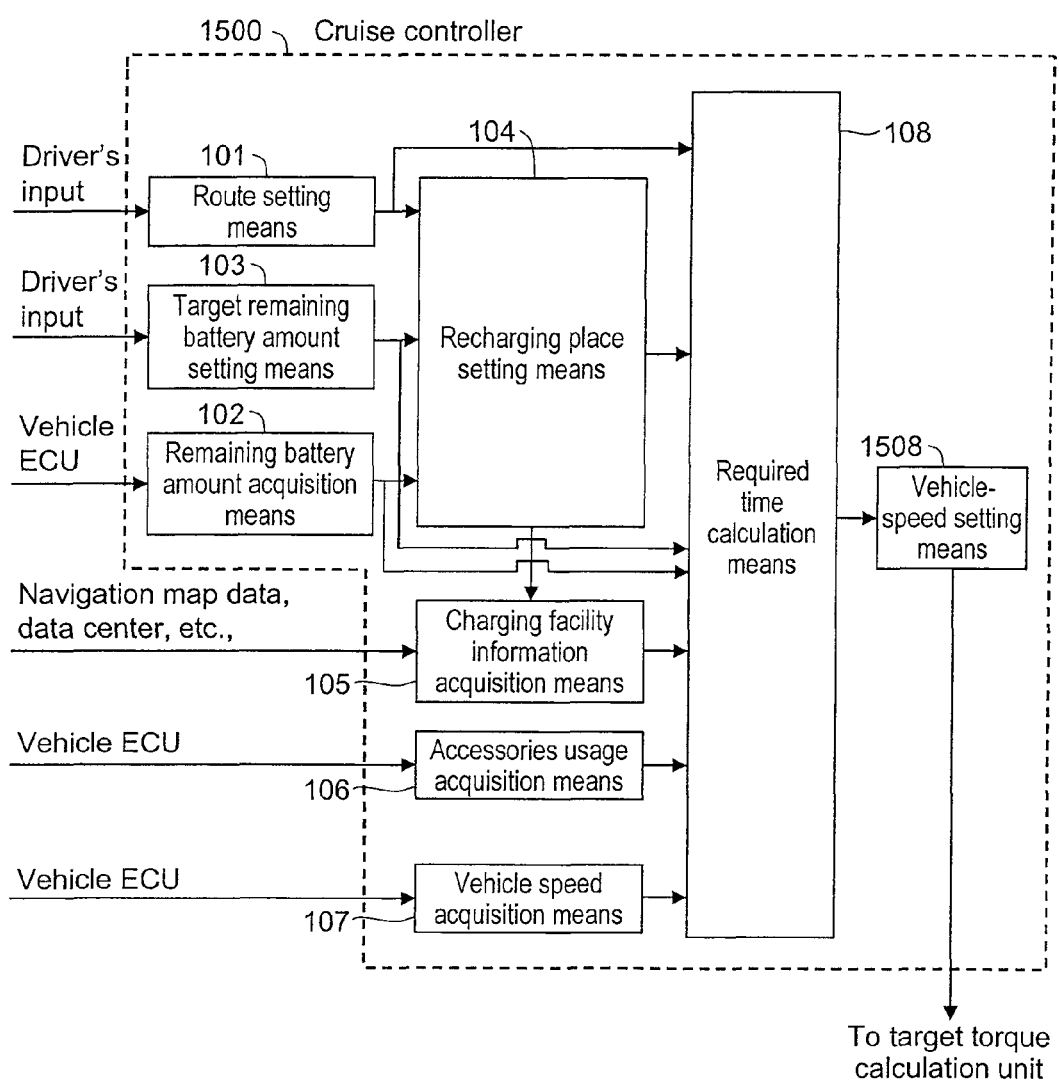
FIG. 15 shows an exemplary system configuration of a cruise controller that is Embodiment 2 of the present invention.

FIG. 15 shows an exemplary configuration of a cruise controller of Embodiment 2. A cruise controller 1500 of Embodiment 2 includes means as blocks 101 to 108 and block 1508 described in the following. Since the means of blocks 101 to 108 of Embodiment 2 have the same function and are the same as blocks 101 to 108 of Embodiment 1, their descriptions are omitted.

Vehicle-speed setting means 1508 of FIG. 15 refers to total required times for different vehicle speeds calculated by the required time calculation means 108 and sets the vehicle speed for the shortest total required time as a vehicle speed for cruise traveling. Then, the set vehicle speed is input to a target torque calculation unit not illustrated, and braking/driving of the vehicle is controlled thereby.

Figure 16:
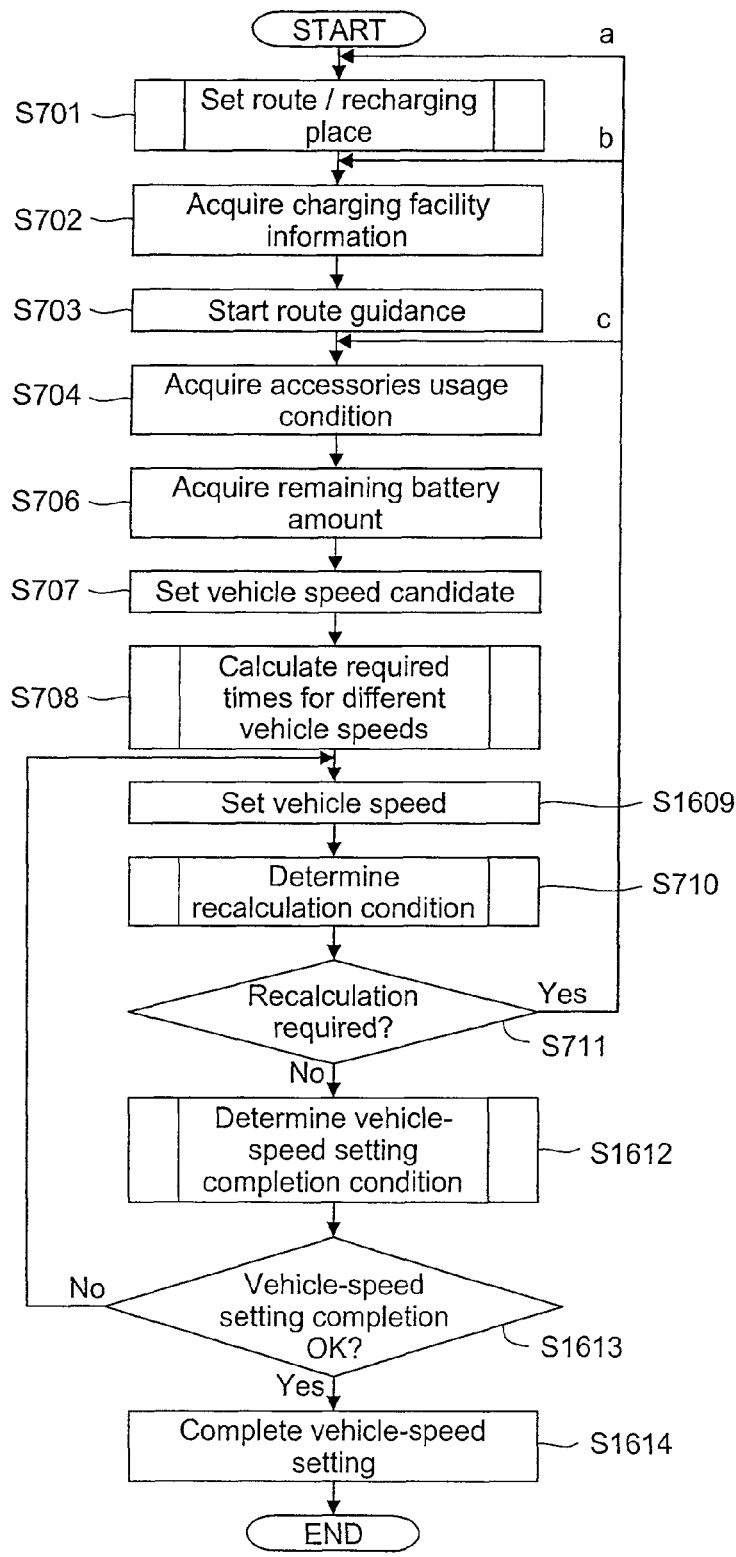
FIG. 16 is an exemplary flowchart showing the overall processing by the cruise controller of Embodiment 2.

FIG. 16 is a flowchart showing the overall processing by the cruise controller of Embodiment 2. Since Steps S701 to S704 and Steps S706 to S708 of Embodiment 2 are the same processing as Steps S701 to S704 and Steps S706 to S708 of Embodiment 1, their descriptions are omitted.

Then at Step S1609, a vehicle speed that can shorten a total required time is set as the vehicle speed for cruise control on the basis of data on total required times for different vehicle speeds that is calculated at Step S708 and is stored as an array.

Since Steps S710 and S711 are the same processing as Steps S710 and S711 of Embodiment 1, their descriptions are omitted.

At Step S1612, determination is made for a condition on the vehicle-speed setting completion. A condition on the vehicle-speed setting completion includes the case where the vehicle arrives at the recharging place, the case where the vehicle is confirmed to stop for predetermined time duration (e.g., 5 minutes) or longer or the case where the operator performs an accelerator operation or a brake operation to cancel the cruise control. At Step S1613, when the determination result at Step S1612 meets the vehicle-speed setting completion condition, the procedure proceeds to Step S1614 to complete the vehicle-speed setting. On the other hand, when the determination result does not meet the vehicle-speed setting completion condition, the procedure returns to Step S1609 to continue the vehicle-speed setting.

The present invention is not limited to Embodiments 1 and 2, and may be embodied in various different forms to cope with the problems in accordance with the invention recited in the appended claims.

DESCRIPTION OF REFERENCE NUMBERS

| | |
|---|---|
| 100 | Vehicle-mounted information terminal |
| 101 | Route setting means |
| 102 | Remaining battery amount acquisition means |
| 103 | Target remaining battery amount setting means |
| 104 | Recharging place setting means |
| 105 | Charging facility information acquisition means |
| 106 | Accessories condition acquisition means |
| 107 | Vehicle speed acquisition means |
| 108 | Required time calculation means |
| 109 | Display means |
| 110 | Vocal guidance means |
| 1500 | Cruise controller |
| 1508 | Vehicle-speed setting means |

What is claimed is:

1. An information terminal for electric-powered vehicle configured to calculate a required time for the vehicle to travel a route from a current position to a destination in accordance with map information, comprising:
   route setting means that searches for a route to the destination for setting;
   recharging place setting means that sets a charging place, at which the vehicle needs to be recharged, on a way of the route to the destination set by the route setting means; and
   charging facility information acquisition means that acquires information on the charging place set by the recharging place setting means,
   wherein
   a recommended vehicle speed for a shortest total required time that is a sum of a required traveling time and a required recharging time for recharging the vehicle at the charging place, or a vehicle speed range including the recommended vehicle speed at a section to the charging place is calculated.

2. The information terminal for electric-powered vehicle according to claim 1, further comprising remaining battery amount acquisition means that acquires remaining capacity of a vehicle-mounted battery,
   wherein
   a charging time at the charging place and a total required time to the destination including the charging time are calculated, in addition to the recommended vehicle speed or the vehicle speed range including the recommended vehicle speed.

3. The information terminal for electric-powered vehicle according to claim 2, further comprising accessories usage detection means that detects a usage condition of a vehicle-mounted accessories,
   wherein
   when the accessories usage detection means confirms an increase of electric power used by the accessories, the recommended vehicle speed or the vehicle speed range including the recommended vehicle speed is changed to a high vehicle-speed side as compared with prior to the confirmation of the increase of electric power used by the accessories.

4. The information terminal for electric-powered vehicle according to claim 1,
   wherein
   when the charging facility information acquisition means confirms an increase of an output from a charging facility to be used, the recommended vehicle speed or the vehicle speed range including the recommended vehicle speed is changed to a high vehicle-speed side as compared with prior to the confirmation of the increase of the output from the charging facility, and
   when the charging facility information acquisition means finds a decrease of an output from a charging facility to be used, the recommended vehicle speed or the vehicle speed range including the recommended vehicle speed is changed to a low vehicle-speed side as compared with prior to the confirmation of the decrease of the output from the charging facility.

5. The information terminal for electric-powered vehicle according to claim 1, further comprising display means,
   wherein
   the display means displays information on a result of the calculation to provide a driver with the information.

6. A cruise controller for an electric-powered vehicle comprising an information terminal configured to calculate a required time for the vehicle to travel a route from a current position to a destination in accordance with map information, comprising:
   route setting means that searches for a route to the destination for setting;
   recharging place setting means that sets a charging place, at which the vehicle needs to be recharged, on a way of the route to the destination set by the route setting means; and
   charging facility information acquisition means that acquires information on the charging place set by the recharging place setting means, wherein a recommended vehicle speed for a shortest total required time that is a sum of a required traveling time and a required recharging time for recharging the vehicle at the charging place, or a vehicle speed range including the recommended vehicle speed at a section to the charging place is calculated,
   and further comprising vehicle-speed setting means that sets the recommended vehicle speed as a standard vehicle speed,
   wherein a vehicle speed of the electric-powered vehicle automatically follows the standard vehicle speed.

* * * * *